(12) United States Patent
Liu et al.

(10) Patent No.: US 8,811,239 B2
(45) Date of Patent: *Aug. 19, 2014

(54) COMMUNICATION METHOD AND DEVICE

(75) Inventors: Guangyi Liu, Beijing (CN); Lu Han, Beijing (CN); Yuhong Huang, Beijing (CN)

(73) Assignee: China Mobile Communication Corporation, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,323

(22) Filed: May 2, 2012

(65) Prior Publication Data

US 2012/0281599 A1    Nov. 8, 2012

Related U.S. Application Data

(63) Continuation of application No. 12/679,876, filed as application No. PCT/CN2008/001672 on Sep. 27, 2008, now Pat. No. 8,228,828.

(30) Foreign Application Priority Data

Sep. 29, 2007   (CN) .......................... 2007 1 0175463

(51) Int. Cl.
*H04J 3/00*    (2006.01)
*H04B 7/26*    (2006.01)
*H04J 3/16*    (2006.01)
*H04J 3/22*    (2006.01)

(52) U.S. Cl.
CPC .................................. *H04B 7/2656* (2013.01)

USPC .......................... 370/280; 370/336; 370/470

(58) Field of Classification Search
None
See application file for complete search history.

(56) References Cited

U.S. PATENT DOCUMENTS

| 8,228,828 | B2 * | 7/2012 | Liu et al. ...................... 370/280 |
| 2006/0140257 | A1 * | 6/2006 | Liu ................................. 375/148 |
| 2006/0176966 | A1 | 8/2006 | Stewart |
| 2008/0205366 | A1 | 8/2008 | Wang |
| 2008/0240002 | A1 | 10/2008 | Li |

FOREIGN PATENT DOCUMENTS

| CN | 1832378 | 9/2006 |
| CN | 1909533 | 2/2007 |
| CN | 101005305 | 7/2007 |

* cited by examiner

*Primary Examiner* — Xavier Szewai Wong
(74) *Attorney, Agent, or Firm* — Workman Nydegger

(57) ABSTRACT

A communication method and device are applicable in a mobile communication system of LTE Type 2 wideband TDD. The method includes: transmitting, by a first communication device, to a second communication device a radio frame, where the radio frame includes a data timeslot for transmitting data, an uplink special timeslot and a downlink special timeslot for carrying synchronizing information, and the data timeslot is shorter than an original data timeslot by a first timeslot, and at least part of the first timeslot is located at the downlink special timeslot.

8 Claims, 4 Drawing Sheets

COMMUNICATION METHOD AND DEVICE

RELATED APPLICATIONS

The present application is a continuation of U.S. patent application Ser. No. 12/679,876, entitled COMMUNICATION METHOD AND DEVICE, filed on Mar. 24, 2010, which is a 371 of PCT/CN08/01672, entitled COMMUNICATION METHOD AND DEVICE, filed on Sep. 27, 2008, which claims priority to CN application 200710175463.1, filed on Sep. 29, 2007. All of the foregoing applications are incorporated herein by reference in their respective entireties.

FIELD OF THE INVENTION

The present invention relates to communication technologies and particularly to a communication method and device.

BACKGROUND OF THE INVENTION

As illustrated in FIG. 1, a radio frame transmitted between a User Equipment and a base station in a mobile communication system of Long Term Evolution Type 2 wideband Time Division Duplex (LTE Type 2 TDD) has a length of 10 ms. Each radio frame is divided into two half-frames. Each half-frame includes seven sub-frames (also referred to as data timeslots) and three special timeslots. In an LTE system with a bandwidth of 20 MHz, for example, the bandwidth of the system is 20 MHz, an interval between sub-carriers is $\Delta f=15$ KHz, the number of FFT sample points is NFFT=2048, and the minimum time unit $Ts=1/(\Delta f \times NFFT)=1/(15000 \times 2048)=0.03255$ μs. In this case, each of the seven data timeslots is used for transmission of uplink or downlink data and is consisted of Cyclic Prefixes (CPs) and Orthogonal Frequency Division Multiplex (OFDM) symbols, where each OFDM symbol has a length of 2048×Ts, each short CP has a length of 256×Ts, each long CP has a length of 544×Ts, and each data timeslot has a total length of 675 μs (20736×Ts). The data timeslots may be divided into uplink timeslots and downlink timeslots; each downlink timeslot includes nine OFDM symbols in the case of short CPs, or eight OFDM symbols in the case of long CPs, and each uplink timeslot includes nine long blocks in the case of short CPs, or eight long blocks in the case of long CPs. The seven data timeslots may be identified with #0, #1, #2, #3, #4, #5 and #6 or with TS0, TS1, TS2, TS3, TS4, TS5 and TS6, where #0 corresponds to TS0, #1 corresponds to TS1, and the like. Timeslot #0 is used only for downlink. The three special timeslots include a downlink special timeslot (DwPTS), a guard timeslot (GP) and an uplink special timeslot (UpPTS), where the downlink special timeslot DwPTS with a length of 2572×Ts is located succeeding the timeslot TS0 and includes one CP (with a length of 524×Ts) and one OFDM symbol (with a length of 2048×Ts), which is used for carrying a primary synchronous channel (P-SCH) to implement operations such as searching for a cell and downlink synchronization, while a secondary synchronous channel (S-SCH) is transmitted in the last symbol of the data timeslot #0; the uplink special timeslot UpPTS with a length of 4340×Ts is located succeeding the GP and preceding the timeslot TS1 to enable an uplink random access, etc; and the guard timeslot GP with a length of 50 μs (1536×Ts), which carries no data signal, is located preceding the uplink special timeslot UpPTS to prevent interference of the downlink special timeslot with the uplink special timeslot.

In the foregoing data frame structure, occupancy of the last symbol of the timeslot #0 by the S-SCH limits the efficiency of transmitting information such as a broadcast channel (BCH) in the timeslot #0. On the other hand, since the DwPTS is spaced from the uplink timeslot by a timeslot GP only, when the DwPTS is drifting or the power of the DwPTS is increased, interference of the DwPTS with the uplink timeslot may be caused, resulting in a degraded communication quality.

SUMMARY OF THE INVENTION

Embodiments of the invention provide a communication method and device to address the problem of the interference of the DwPTS with the uplink timeslot in the prior art.

An embodiment of the invention provides a communication method applicable in a mobile communication system of Long Term Evolution Type 2 wideband Time Division Duplex, and the method includes:

transmitting, by a first communication device, to a second communication device a radio frame, where the radio frame includes a data timeslot for transmitting data, an uplink special timeslot and a downlink special timeslot for carrying synchronization information;

wherein the data timeslot is shorter than an original data timeslot by a first timeslot, and at least part of the first timeslot is located at the downlink special timeslot.

An embodiment of the invention further provides a communication device applicable in a mobile communication system of Long Term Evolution Type 2 wideband Time Division Duplex, which includes:

a transmission unit configured to transmit a radio frame, wherein the radio frame includes a data timeslot for transmitting data, an uplink special timeslot and a downlink special timeslot for carrying synchronization information, and the data timeslot is shorter than an original data timeslot by a first timeslot, and at least part of the first timeslot is located at the downlink special timeslot.

An embodiment of the invention further provides a communication method applicable in a mobile communication system of Long Term Evolution Type 2 wideband Time Division Duplex, which includes:

transmitting, by a first communication device to a second communication device a radio frame, each half-frame of the radio frame including a data timeslot for transmitting data, and a downlink special timeslot for carrying synchronization information, where the data timeslot is no longer than 667 μs.

Preferably, the half-frame of the radio frame further includes an uplink special timeslot no longer than 116.67 μs.

Preferably, the half-frame of the radio frame further includes a guard timeslot for preventing interference between uplink and downlink timeslots, and the guard timeslot is longer than 50 μs.

Correspondingly, an embodiment of the invention further provides a communication device applicable in a mobile communication system of Long Term Evolution Type 2 wideband Time Division Duplex, which includes: a transmission unit configured to transmit a radio frame, each half-frame of the radio frame including a data timeslot for transmitting data, and a downlink special timeslot for carrying synchronization information, where the data timeslot is no longer than 667 μs.

According to the embodiments of the invention, through shortening in length the data timeslot and/or the uplink special timeslot and making reasonable use of the spared timeslot part due to the shortening of the data timeslot and/or the uplink special timeslot, for example, by arranging that part in the GP, it is possible to increase an interval between the DwPTS and the UpPTS to thereby reduce interference of the DwPTS with the uplink timeslot. Alternatively, by composing that spared timeslot part due to the shortening of the data timeslot and/or the uplink special timeslot into a symbol (referred to as a first symbol for the sake of convenient descriptions) so as to add the symbol into the half-frame, it is possible to arrange the S-SCH in the first symbol to thereby avoid a symbol of any data timeslot from being occupied by the S-SCH, so that on one hand a utilization ratio of resources may be improved, and on the other hand the timeslot of DwPTS may be moved, for example, by arranging the DwPTS at the head of the half-frame, due to two OFDM symbols being contained in the DwPTS to carry the S-SCH and the P-SCH, to thereby address effectively the problem of the interference of the DwPTS with the uplink timeslot due to an power increase of the DwPTS.

DETAILED DESCRIPTION OF THE EMBODIMENTS

The embodiments of the invention are described hereinafter with reference to the drawings for better understanding and implementing of the invention by those ordinarily skilled in the art.

A First Embodiment

An embodiment of the invention provides a communication method including: transmitting, by a first communication device, a data frame to a second communication device. The data frame includes a data timeslot, an uplink special timeslot, a downlink special timeslot and a guard timeslot, where the data timeslot and the uplink special timeslot are shorter than the respective existing timeslots, the downlink special timeslot and/or the guard timeslot are/is longer than the respective existing timeslot(s), and a total length of the data timeslot, the uplink special timeslot, the downlink special timeslot and the guard timeslot is kept unchanged. Particularly, the data timeslot is used for transmission of uplink or downlink data; the downlink special timeslot is used for carrying synchronization information to implement operations of searching for a cell, downlink synchronization, etc.; the UpPTS is an uplink special timeslot succeeding the GP and preceding the timeslot TS1 to enable an uplink random access, etc; and the GP is used to prevent interference between uplink and downlink timeslots, i.e., interference of the downlink special timeslot with the uplink timeslot. An example of shortening the data timeslot and the uplink special timeslot is described below.

Figure 1:
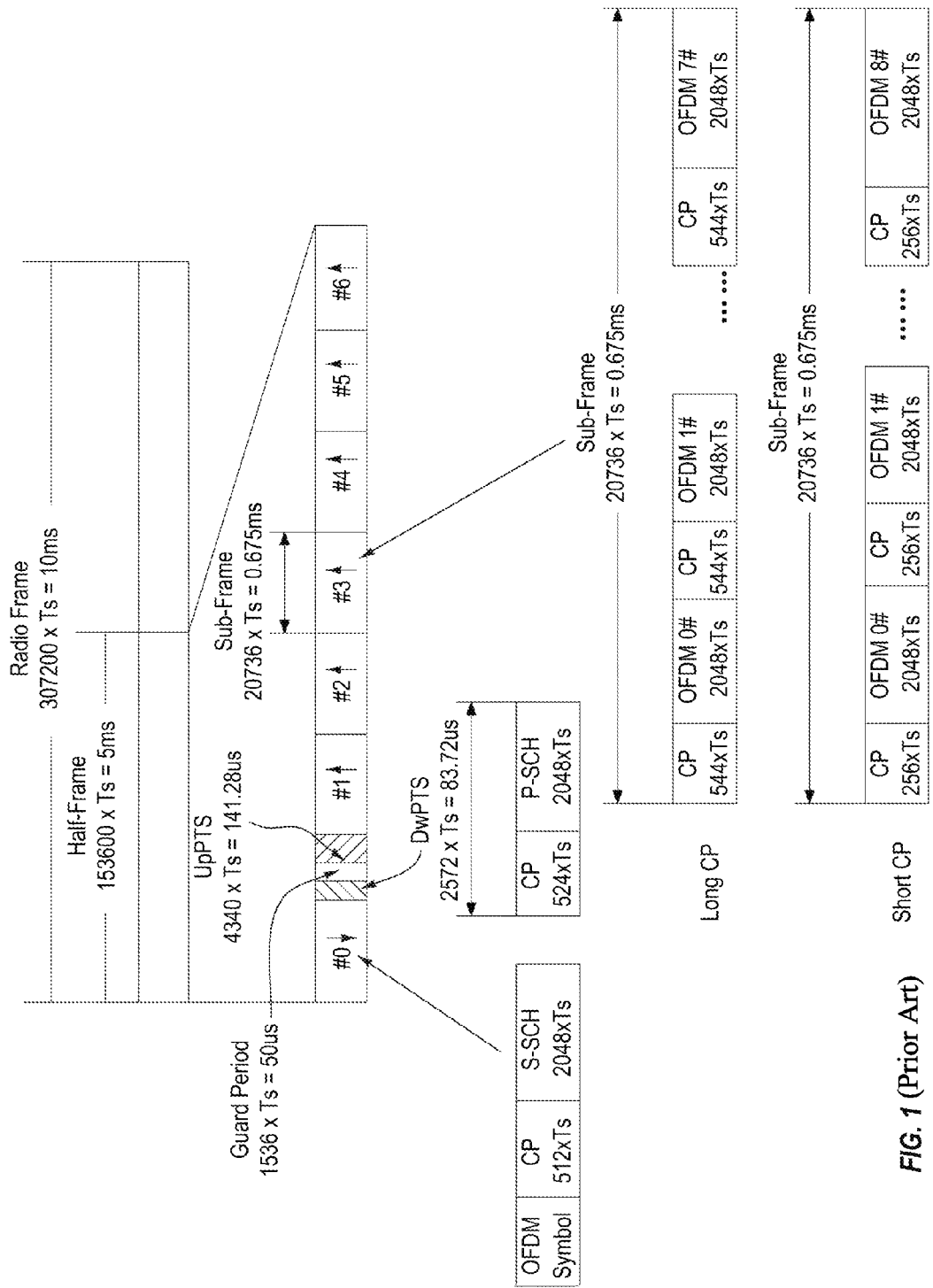
FIG. 1 illustrates a schematic diagram of the structure of a radio frame in the prior art.
Figure 2:
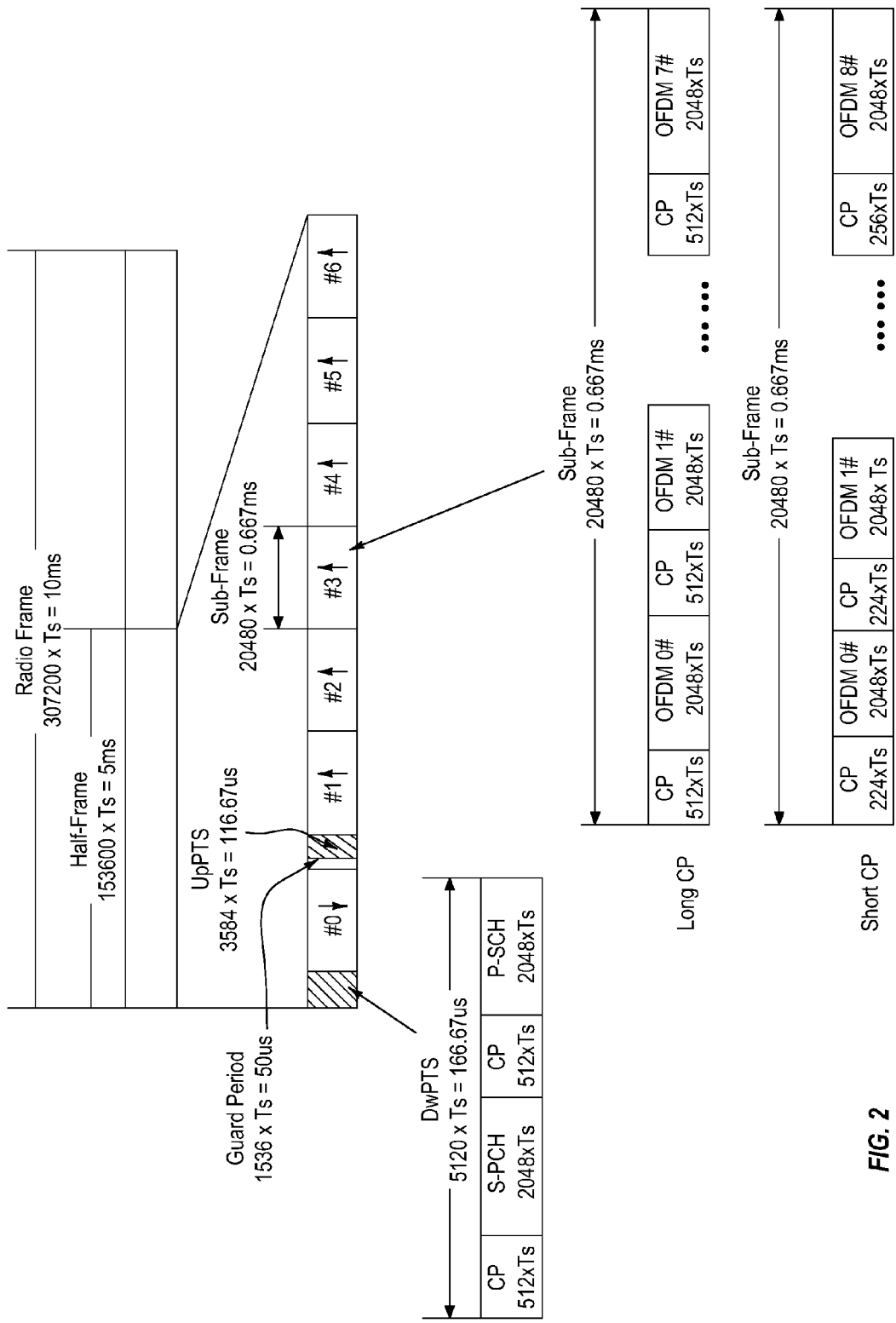
FIG. 2 illustrates a schematic diagram of the structure of a radio frame according to a first embodiment of the invention.

As illustrated in FIG. 2, the data timeslot and/or the timeslot UpPTS are/is shorten in length, for example, by shortening the data timeslots 0# to #6 from 675 μs to 667 μs and the timeslot UpPTS from 141.28 μs to 116.67 μs in length to thereby spare 80.61 μs. For the sake of description, a spared timeslot due to shortening the data timeslot is referred to as a first timeslot, and a spared timeslot due to shortening the timeslot UpPTS is referred to as a second timeslot. The shortening may be implemented by reducing the length of the CP in the data timeslot and/or of the CP in the timeslot UpPTS, for example, by changing the length of a long CP from 544× Ts to 512×Ts and a short CP from 256×Ts to 224×Ts; alternatively, the shortening may be implemented by reducing directly the number of OFDM symbols in a data timeslot, e.g. the data timeslot #6. Through the foregoing adjusting of the data frame and the subsequently reasonable use of the first timeslot and/or the second timeslot, it is possible to reduce the interference of the DwPTS with the uplink timeslot when the DwPTS is drifting to thereby obtain an improved communication quality. Different technical solutions are described below dependent upon locations of the first timeslot.

Figure 3:
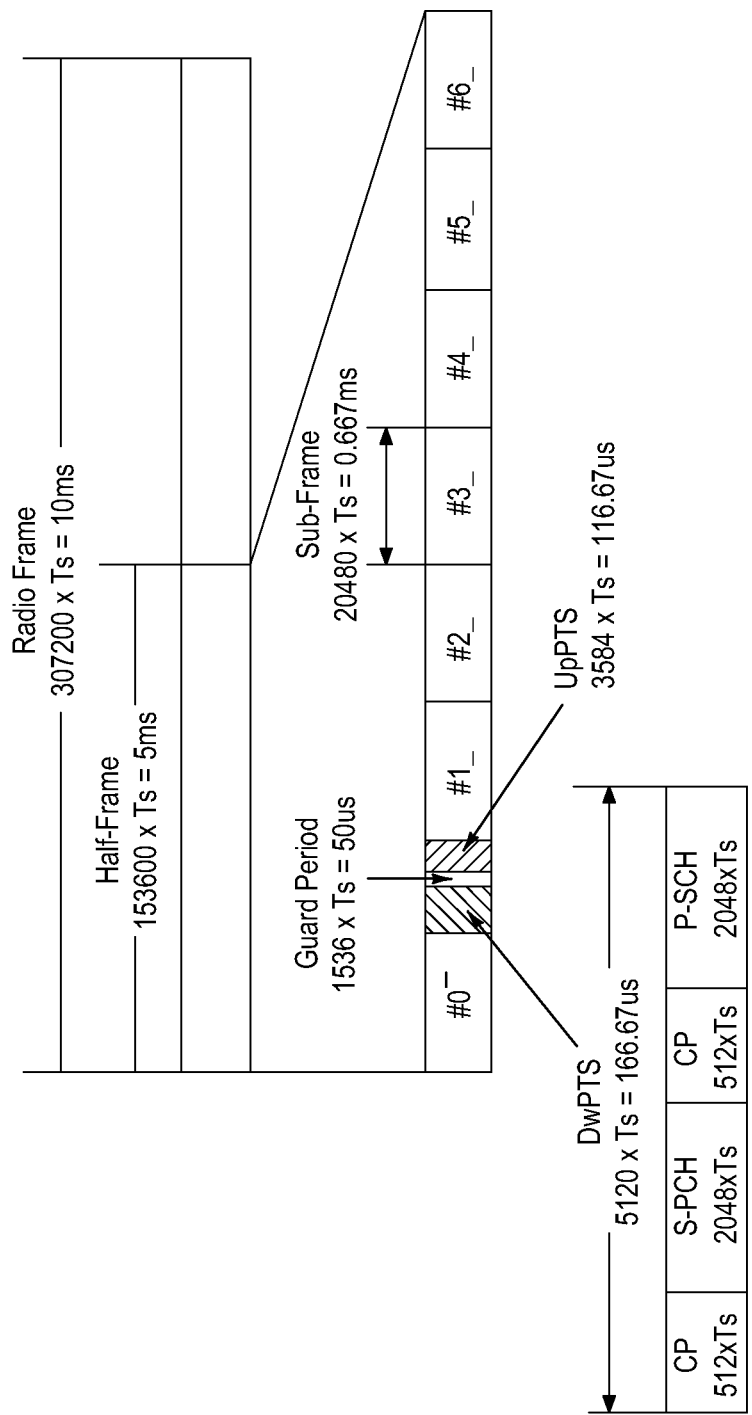
FIG. 3 illustrates a schematic diagram of another structure of a radio frame according to a first embodiment of the invention.

In a first solution as illustrated in FIG. 3, when the first timeslot and/or the second timeslot compose(s) in length at least one OFDM symbol, e.g., one OFDM symbol, the first timeslot and/or the second timeslot may be arranged at front of the DwPTS, and the S-SCH in the original data timeslot #0 may be arranged in the first timeslot and/or the second timeslot, so that the S-SCH may be merged together with the P-SCH in the DwPTS to result in a new timeslot DwPTS, and thus one symbol may be spared in the timeslot #0 to facilitate transmission of other information to thereby improve a utilization ratio of resources. In this case, the DwPTS may be flexibly positioned due to two OFDM symbols (i.e. the S-SCH and the P-SCH) contained therein. As illustrated in FIG. 2, the DwPTS is arranged at the head of the data frame and thus may be spaced away from the UpPTS, to thereby reduce the interference of the DwPTS with the uplink timeslot due to a drift or power increase of the DwPTS, and hence improve the communication quality. Moreover, since a signal of the P-SCH is required for the S-SCH to perform channel estimation, the channel estimation may be performed accurately without degrading the performance of the system because both of the P-SCH and the S-SCH are transmitted in the adjacent symbols.

In a second solution, a part of or all of the first timeslot and/or the second timeslot is arranged at the tail of the DwPTS, such that the DwPTS may be further spaced from the UpPTS by an increased distance due to addition of the succeeding first timeslot, to thereby reduce the interference of the DwPTS with the uplink timeslot due to a drift or power increase of the DwPTS and hence improve the communication quality.

Figure 4:
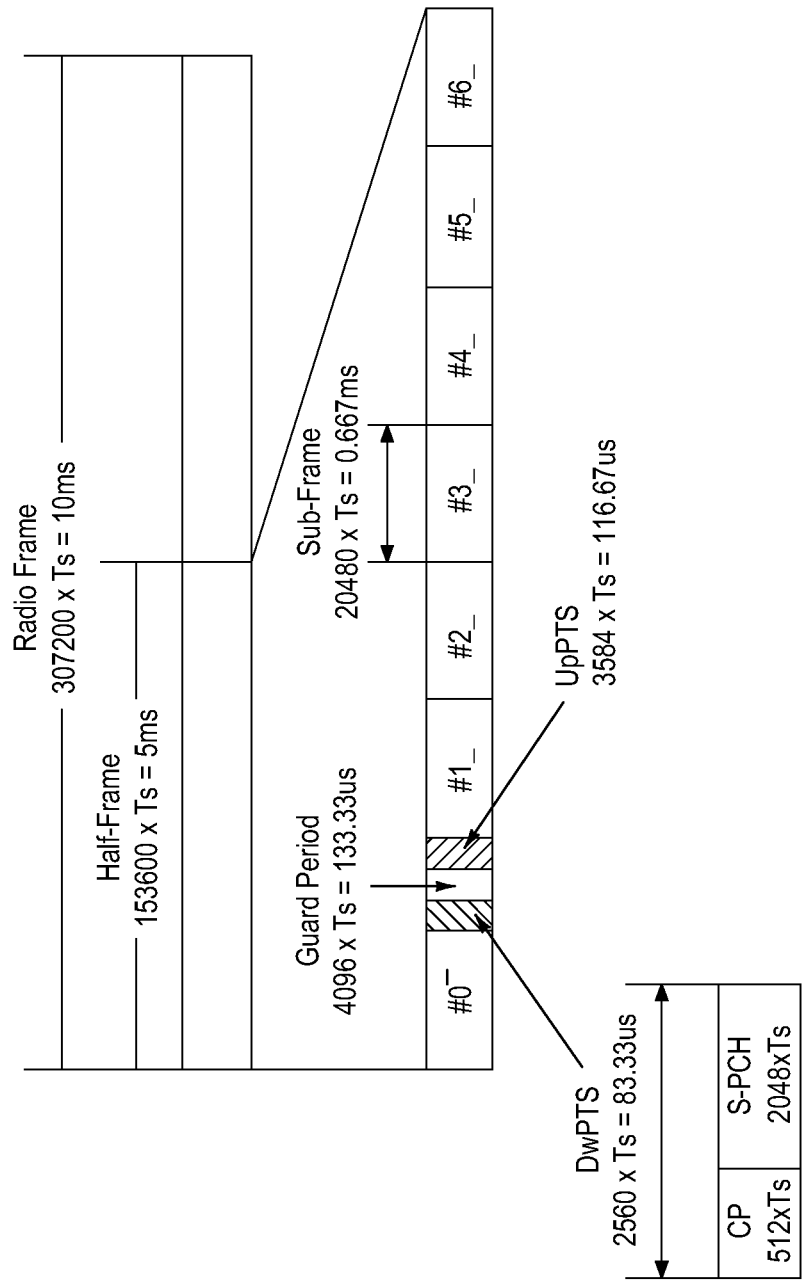
FIG. 4 illustrates a schematic diagram of a further structure of a radio frame according to a first embodiment of the invention.

In a third solution as illustrated in FIG. 4, a part of or all of the first timeslot and/or the second timeslot is arranged in the GP, such that the DwPTS may be spaced from the UpPTS by an increased interval due to an increase in the length of the GP (that is, the length of the GP is made larger than 50 μs) and hence an extended period of the guard timeslot, to thereby reduce the interference of the DwPTS with the uplink timeslot due to a drift or power increase of the DwPTS and hence improve the communication quality.

A Second Embodiment

The present embodiment discloses a communication device including: a transmission unit configured to transmit a radio frame, where each half-frame of the radio frame includes a data timeslot for transmitting data, and a downlink special timeslot for carrying synchronization information, the data timeslot is shorter than an original data timeslot, for example, the data timeslots #0 to #6 may be shortened from 675 μs to 667 μs as in the foregoing embodiment of the method, and for the sake of description, a spared timeslot due to shortening the data timeslot is referred to as a first timeslot, at least a part of which is arranged at the head and/or tail of the downlink special timeslot. Since the downlink special timeslot is longer than an original downlink special timeslot, for example, by one OFDM symbol, the S-SCH may be arranged in the OFDM symbol, and in this case one symbol may be spared in the data timeslot #0 for transmission of other data to thereby improve the communication efficiency. On the other hand, the downlink special timeslot may be moved as a complete timeslot, for example, to the head of the half-frame so as to be spaced from an uplink timeslot by an increased distance to thereby reduce the interference of the DwPTS with the uplink timeslot due to a drift or power increase of the DwPTS.

The present embodiment further discloses another communication device including a transmission unit configured to transmit a radio frame, where each half-frame of the radio frame includes a data timeslot for transmitting data, a downlink special timeslot for carrying synchronization information, and a guard timeslot for preventing interference between uplink and downlink timeslots, and the data timeslot is shorter than an originally configured data timeslot by a first timeslot, at least a part of the first timeslot is located in the guard timeslot, the guard timeslot is longer than an originally configured guard timeslot, and a total length of the data timeslot, the downlink timeslot and the guard timeslot is kept unchanged. Interference of the DwPTS with the uplink timeslot due to a drift or power increase of the DwPTS may be reduced due to the longer guard timeslot than originally configured and hence an increased distance between the downlink timeslot and the uplink timeslot.

According to the embodiments of the invention, through shortening the length of the data timeslot and/or the length of the uplink special timeslot and making reasonable use of a spared timeslot part obtained by the shortening of the data timeslot and/or the uplink special timeslot, for example, by arranging such spared part in the GP, it is possible to increase an interval between the DwPTS and the UpPTS to thereby reduce the interference of the DwPTS with the uplink timeslot. Alternatively, by composing that spared timeslot part(s) due to the shortening of the data timeslot and/or the uplink special timeslot into a symbol (referred to as a first symbol for the sake of description) so as to add that symbol into the half-frame, it is possible to prevent a symbol of any data timeslot from being occupied by the S-SCH, so that on one hand a utilization ratio of resources may be improved, and on the other hand the timeslot of DwPTS may be moved, for example, by arranging the DwPTS at the head of the half-frame, because two OFDM symbols are contained in the DwPTS to carry the S-SCH and the P-SCH, to thereby address effectively the problem of the interference of the DwPTS with the uplink timeslot due to an power increase of the DwPTS.

Although the invention has been described in connection with the embodiments thereof, those ordinarily skilled in the art shall appreciate that numerous modifications and variations may be made to the invention without departing from the scope of the invention as defined in the appended claims.

The invention claimed is:

1. A communication method applicable in a mobile communication system of Long Term Evolution Type 2 wideband Time Division Duplex, comprising:
    transmitting, by a first communication device, to a second communication device a radio frame, wherein the radio frame comprises a data timeslot for transmitting data, an uplink special timeslot and a downlink special timeslot for carrying synchronization information;
    wherein the data timeslot is shorter by a first timeslot than an original data timeslot initially defined with a length of 675 μs in the mobile communication system of Long Term Evolution Type 2 wideband Time Division Duplex, and at least part of the first timeslot is located at the downlink special timeslot;
    wherein the uplink special timeslot is shorter by a second timeslot than an original uplink special timeslot initially defined with a length of 141.28 μs in the mobile communication system of Long Term Evolution Type 2 wideband Time Division Duplex.

2. The method according to claim 1, wherein a cyclic prefix in the original data timeslot is shortened or the number of Orthogonal Frequency Division Multiplex symbols in the original data timeslot is reduced, so that the data timeslot is shorter than the original data timeslot by the first timeslot.

3. The method according to claim 1, wherein a cyclic prefix in the original uplink special timeslot is shortened, so that the uplink special timeslot is shorter than the original uplink special timeslot by the second timeslot.

4. The method according to claim 1, wherein the radio frame further comprises a guard timeslot for preventing interference between uplink and downlink timeslots; and at least part of the first timeslot and/or at least part of the second timeslot is located in the guard timeslot.

5. A communication device applicable in a mobile communication system of Long Term Evolution Type 2 wideband Time Division Duplex, comprising:
    a transmission unit configured to transmit a radio frame, wherein the radio frame comprises a data timeslot for transmitting data, an uplink special timeslot and a downlink special timeslot for carrying synchronization information;
    wherein the data timeslot is shorter by a first timeslot than an original data timeslot initially defined with a length of 675 μs in the mobile communication system of Long Term Evolution Type 2 wideband Time Division Duplex, and at least part of the first timeslot is located at the downlink special timeslot;
    wherein the uplink special timeslot is shorter by a second timeslot than an original uplink special timeslot initially defined with a length of 141.28 μs in the mobile communication system of Long Term Evolution Type 2 wideband Time Division Duplex.

6. The device according to claim 5, wherein a cyclic prefix in the original data timeslot is shortened or the number of Orthogonal Frequency Division Multiplex symbols in the original data timeslot is reduced, so that the data timeslot is shorter than the original data timeslot by the first timeslot.

7. The device according to claim 5, wherein a cyclic prefix in the original uplink special timeslot is shortened, so that the uplink special timeslot is shorter than the original uplink special timeslot by the second timeslot.

8. The device according to claim 5, wherein the radio frame further comprises a guard timeslot for preventing interference between uplink and downlink timeslots; and
    at least part of the first timeslot and/or at least part of the second timeslot is located in the guard timeslot.

* * * * *